US009256918B2

(12) United States Patent
Shaw et al.

(10) Patent No.: US 9,256,918 B2
(45) Date of Patent: Feb. 9, 2016

(54) METHOD AND APPARATUS FOR ADAPTING MEDIA CONTENT FOR PRESENTATION

(75) Inventors: Venson Shaw, Kirkland, WA (US); Jun Shen, Redmond, WA (US)

(73) Assignees: AT&T Intellectual Property I, LP, Atlanta, GA (US); AT&T Mobility II LLC, Atlanta, GA (US)

( * ) Notice: Subject to any disclaimer, the term of this patent is extended or adjusted under 35 U.S.C. 154(b) by 549 days.

(21) Appl. No.: 13/460,003

(22) Filed: Apr. 30, 2012

(65) Prior Publication Data
US 2013/0286019 A1 Oct. 31, 2013

(51) Int. Cl.
G06T 1/00 (2006.01)
G06T 3/40 (2006.01)

(52) U.S. Cl.
CPC ........................................ *G06T 3/40* (2013.01)

(58) Field of Classification Search
None
See application file for complete search history.

(56) References Cited

U.S. PATENT DOCUMENTS

| 5,283,557 | A | | 2/1994 | Memarzadeh | |
|---|---|---|---|---|---|
| 5,497,434 | A | | 3/1996 | Wilson | |
| 5,528,740 | A | | 6/1996 | Hill et al. | |
| 5,726,689 | A | | 3/1998 | Negishi et al. | |
| 6,339,434 | B1 | * | 1/2002 | West | G06T 3/4023 345/667 |
| 6,812,935 | B1 | * | 11/2004 | Joe et al. | 345/660 |
| 6,825,857 | B2 | * | 11/2004 | Harasimiuk | 345/660 |
| 7,053,929 | B2 | * | 5/2006 | Yadid-Pecht et al. | 348/172 |
| 7,831,110 | B2 | * | 11/2010 | Yoshigahara | 382/300 |
| 2009/0060388 | A1 | * | 3/2009 | Shingai et al. | 382/298 |
| 2011/0019239 | A1 | * | 1/2011 | Kojima et al. | 358/401 |
| 2011/0129164 | A1 | * | 6/2011 | Lin et al. | 382/254 |

OTHER PUBLICATIONS

Vaquero et al, "A survey of image retargeting techniques", Proc. of SPIE vol. 7798, 2010.*
Kim et al, "Winscale: An Image-Scaling Algorithm Using an Area Pixel Model", IEEE Trans Circuits and Systems for Video Technology, 13(6), pp. 549-553, Jun. 2003.*
Wang et al, "Optimized Scale-and-Stretch for Image Resizing", ACM Trans on Graphics, 27(5), Article 118, Dec. 2008.*

* cited by examiner

*Primary Examiner* — Ulka Chauhan
*Assistant Examiner* — Patrick F Valdez
(74) *Attorney, Agent, or Firm* — Guntin & Gust, PLC; Ed Guntin

(57) ABSTRACT

A method that incorporates teachings of the subject disclosure may include, for example, mapping image pixels of media content to a first portion of display pixels of a display to create mapped pairs having a mapped image pixel and a mapped display pixel, where the display has at least one of a greater number of horizontal or vertical pixels than the media content and for each mapped pair, one or more values associated with the mapped image pixel are assigned to the mapped display pixel, assigning blended mapped values to unmapped display pixels in a second portion of the display pixels, where, for each unmapped display pixel, the blended mapped value is a statistical compilation of one or more values assigned to the mapped display pixels that are adjacent to the unmapped display pixels, and presenting the mapped and unmapped display pixels at the display. The method includes other embodiments.

18 Claims, 12 Drawing Sheets

700

800

1200

METHOD AND APPARATUS FOR ADAPTING MEDIA CONTENT FOR PRESENTATION

FIELD OF THE DISCLOSURE

The subject disclosure relates generally to digital video and more specifically to a method and apparatus for adapting media content for presentation.

BACKGROUND

Media content is frequently experienced by consumers via devices such as computers, televisions, radios, and mobile electronics. Media content is frequently delivered by service providers, who send the media content, such as television, radio, and video programming, directly to consumers for enjoyment at their physical locations. Modern communication networks benefit from interconnectivity between consumers and various communication devices. As network capabilities expand, these interconnections provide new opportunities to enhance abilities to enjoy media content.

BRIEF DESCRIPTION OF THE DRAWINGS

Reference will now be made to the accompanying drawings, which are not necessarily drawn to scale, and wherein.

DETAILED DESCRIPTION

Figure 1:
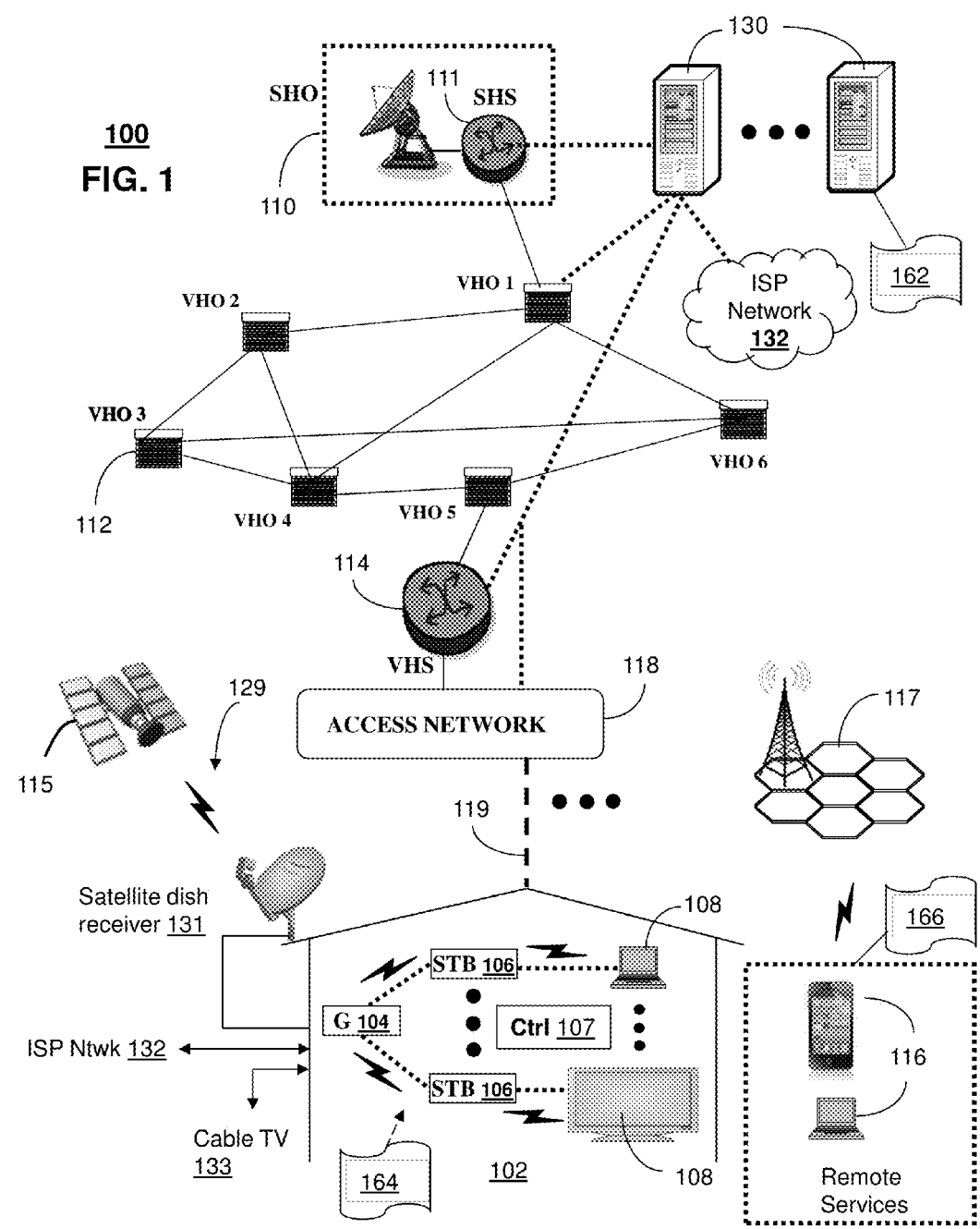
FIGS. 1-2 depict illustrative embodiments of communication systems that provide media services.

The subject disclosure describes, among other things, illustrative embodiments for adapting media content for presentation. Other embodiments are contemplated by the subject disclosure.

One embodiment of the subject disclosure includes a mobile device having a display comprising a plurality of display pixels, a memory storing computer instructions, and a processor coupled to the memory. The processor, responsive to executing the computer instructions, can perform operations including receiving media content comprising a plurality of image pixels and identifying an expansion trigger according to a media content resolution and a display resolution. Responsive to the identified expansion trigger, the processor can also perform operations associating a first portion of the plurality of display pixels with the plurality of image pixels to create a plurality of mapped pairs. Each mapped pair can include a mapped image pixel of a plurality of mapped image pixels and a mapped display pixel of a plurality of mapped display pixels. For each mapped pair of the plurality of mapped pairs, the processor can perform operations assigning at least one value associated with the mapped image pixel to the mapped display pixel. The at least one value can include a color value, an intensity value, or combinations thereof. The processor can further perform operations identifying a second portion of the plurality of display pixels as a plurality of unmapped display pixels. For each unmapped display pixel of the plurality of unmapped display pixels, the processor can perform operations identifying as a plurality of adjacent mapped display pixels a portion of the plurality of mapped display pixels that are adjacent to the unmapped display pixel. For each adjacent mapped display pixel of the plurality of adjacent mapped display pixels, the processor can, in turn, perform operations accessing the at least one value assigned to the mapped display pixel to generate a plurality of mapped values. The process can perform operations averaging the plurality of mapped values to determine a blended mapped value and assigning the blended mapped value to the unmapped display pixel. The can, in turn, perform operations presenting the plurality of mapped display pixels and the plurality of unmapped display pixels at the display.

One embodiment of the subject disclosure includes a computer-readable storage medium having computer instructions, which when executed by at least one processor can cause the at least one processor to perform operations including receiving media content at a mobile device comprising a plurality of image pixels and identifying a reduction trigger according to a media content resolution and a display resolution. Responsive to the identified reduction trigger, the computer instructions can cause the processor to perform operations associating a plurality of display pixels of the display with the plurality of image pixels to identify a plurality of mapped pairs. Each mapped pair can include a mapped image pixel of a plurality of mapped image pixels and a mapped display pixel of a plurality of mapped display pixels. For each mapped pair of the plurality of mapped pairs, the computer instructions can cause the processor to perform operations identifying as a plurality of adjacent mapped image pixels a portion of the plurality of mapped image pixels that are adjacent to the mapped image pixel of the mapped pair. For each adjacent mapped image pixel of the plurality of adjacent mapped image pixels, the computer instructions can cause the processor to perform operations accessing at least one value associated with the adjacent mapped image pixel to generate a plurality of mapped values. The computer instructions can further cause the processor to perform operations determining a blended mapped value according to the plurality mapped values and assigning the blended mapped value to the mapped display pixel associated with the mapped image pixel in the mapped pair. The computer instructions can, in turn, cause the processor to perform operations presenting the plurality of mapped display pixels at the display.

One embodiment of the subject disclosure includes a method for mapping, by a system comprising at least one processor and a display, a plurality of image pixels of media content to a first portion of a plurality of display pixels of the display to create a plurality of mapped pairs each comprising a mapped image pixel of a plurality of mapped image pixels and a mapped display pixel of a plurality of mapped display pixels. The display can include a larger resolution than the media content. For each mapped pair of the plurality of mapped pairs, one or more values associated with the mapped image pixel can be assigned to the mapped display pixel. The method can include assigning a plurality of blended mapped values to a plurality of unmapped display pixels in a second portion of the plurality of display pixels. For each unmapped display pixel of the plurality of unmapped display pixels, the blended mapped value can include a statistical compilation of a plurality of the one or more values assigned to a plurality of the mapped display pixels that are adjacent to the unmapped display pixels. The method can, in turn, include presenting the plurality of mapped display pixels and the plurality of unmapped display pixels at the display.

FIG. 1 depicts an illustrative embodiment of a first communication system 100 for delivering media content. The communication system 100 can represent an Internet Protocol Television (IPTV) media system. Communication system 100 can also provide for all or a portion of the computing devices 130 to function as a media server (herein referred to as media server 130). The media server 130 can use computing and communication technology to perform function 162, which can include among things, transmitting media content including image pixels to a wireless communication device 116 or a media processor device 108. A receiving device 116 can identify trigger for either expanding or reducing the image pixels to accommodate an array of display pixels for the wireless communication device according to a media content resolution and a display resolution.

Responsive to an identified expansion trigger, the receiving device 116 can associate a first portion of the display pixels with the image pixels to create mapped pairs of mapped image pixels and mapped display pixels. For each mapped pair, the receiving device 116 can assign one or more values associated with the mapped image pixel to the mapped display pixel. The receiving device 116 can identify a second portion of the display pixels as unmapped display pixels and, for each unmapped display pixel, can identify adjacent mapped display pixels in a portion of the mapped display pixels that are adjacent to the unmapped display pixel. For each adjacent mapped display pixel, the receiving device 116 can access the one or more values assigned to the mapped display pixel to generate mapped values. The receiving device 116 can statistically compile the mapped values to determine a blended mapped value, assign the blended mapped value to the unmapped display pixel, and present the mapped display pixels and the unmapped display pixels at its display.

Responsive to an identified reduction trigger, the receiving device 116 can associate display pixels with image pixels to identify mapped pairs of mapped image pixels and mapped display pixels. For each mapped pair, the receiving device 116 can identify adjacent mapped image pixels of a portion of mapped image pixels that are adjacent to the mapped image pixel of the mapped pair. For each adjacent mapped image pixel, the receiving device 116 can access one or more values associated with the adjacent mapped image pixel to generate mapped values, can determine a blended mapped value according to the mapped values, and can assign the blended mapped value to the mapped display pixel associated with the mapped image pixel in the mapped pair. The receiving device 116 can present the mapped display pixels at its display.

The media processors 106 and wireless communication devices 116 can be adapted with software functions 164 and 166, respectively, to utilize the services of media server 130. The IPTV media system can include a super head-end office (SHO) 110 with at least one super headend office server (SHS) 111 which receives media content from satellite and/or terrestrial communication systems. In the present context, media content can represent, for example, audio content, moving image content such as 2D or 3D videos, video games, virtual reality content, still image content, and combinations thereof. The SHS server 111 can forward packets associated with the media content to one or more video head-end servers (VHS) 114 via a network of video head-end offices (VHO) 112 according to a common multicast communication protocol.

The VHS 114 can distribute multimedia broadcast content via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provide broadband services over fiber optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote controller).

The gateway 104, the media processors 106, and media devices 108 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 106 and subsystems of the IPTV media system for services such as video-on-demand (VoD), browsing an electronic programming guide (EPG), or other infrastructure services.

A satellite broadcast television system 129 can be used also in the media system of FIG. 1. The satellite broadcast television system can be overlaid, operably coupled with, or replace the IPTV system as another representative embodiment of communication system 100. In this embodiment, signals transmitted by a satellite 115 carrying media content can be received by a satellite dish receiver 131 coupled to the building 102. Modulated signals received by the satellite dish receiver 131 can be transferred to the media processors 106 for demodulating, decoding, encoding, and/or distributing broadcast channels to the media devices 108. The media processors 106 can be equipped with a broadband port to the ISP network 132 to enable interactive services such as VoD and EPG as described above.

In yet another embodiment, an analog or digital cable broadcast distribution system such as cable TV system 133 can be overlaid, operably coupled with, or replace the IPTV system and/or the satellite TV system as another representative embodiment of communication system 100. In this embodiment, the cable TV system 133 can also provide Internet, telephony, and interactive media services.

It is contemplated that the subject disclosure can apply to other present or next generation over-the-air and/or landline media content services system.

Some of the network elements of the IPTV media system can be coupled to one or more computing devices 130, a portion of which can operate as a web server for providing web portal services over an Internet Service Provider (ISP) network 132 to wireline media devices 108 or wireless communication devices 116.

It is further contemplated that multiple forms of media services can be offered to media devices over landline technologies such as those described above. Additionally, media services can be offered to media devices by way of a wireless access base station 117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless network technologies are contemplated by the subject disclosure.

Figure 2:
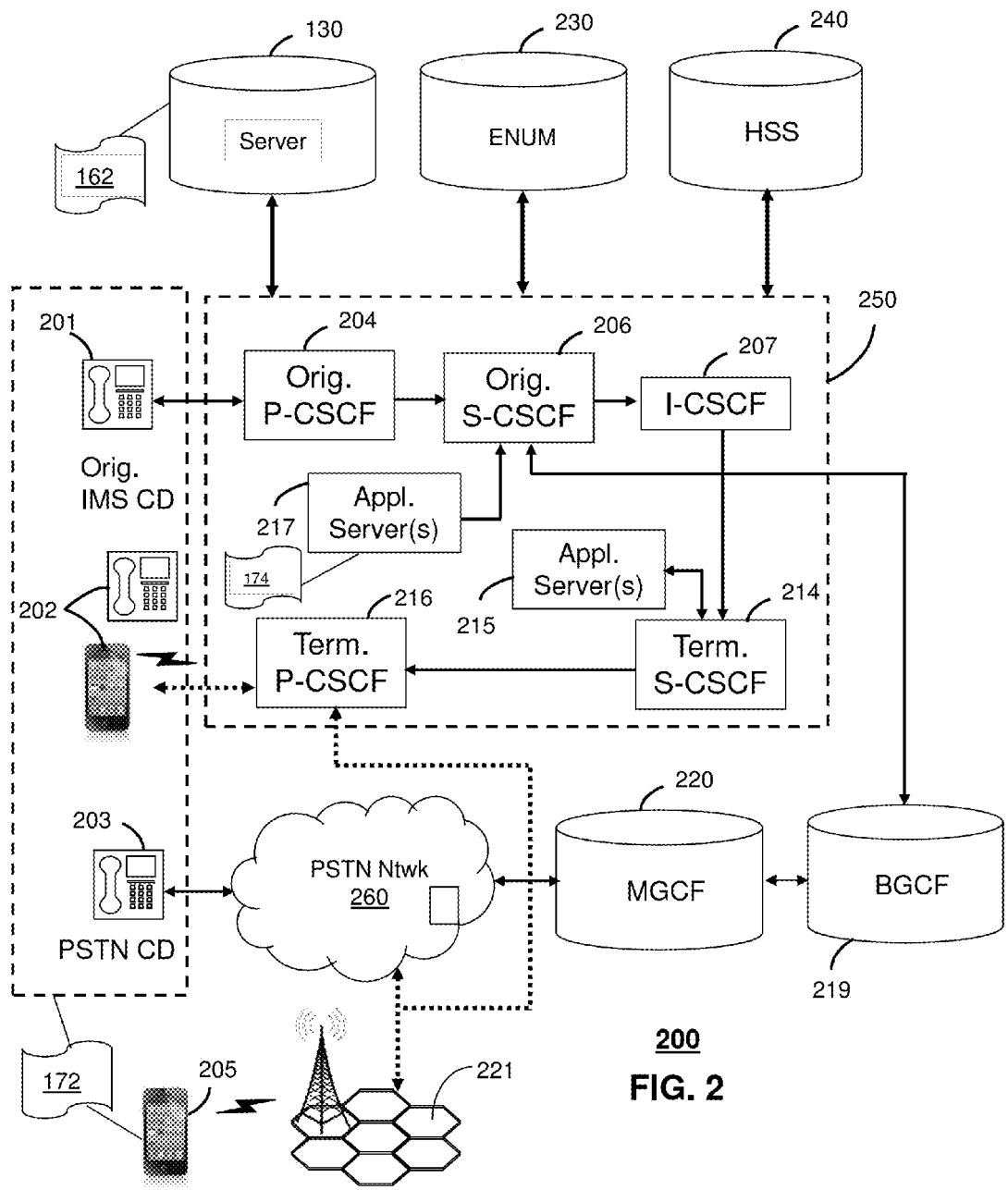

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS-compliant communication devices (CDs) 201, 202, Public Switched Telephone Network (PSTN) CDs 203, 205, and combinations thereof by way of a Media Gateway Control Function (MGCF) 220 coupled to a PSTN network 260. The MGCF 220 need not be used when a communication session involves IMS CD to IMS CD communications. A communication session involving at least one PSTN CD may utilize the MGCF 220.

IMS CDs 201, 202 can register with the IMS network 250 by contacting a Proxy Call Session Control Function (P-CSCF) which communicates with an interrogating CSCF (I-CSCF), which in turn, communicates with a Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit the SIP INVITE message to one or more application servers (ASs) 217 that can provide a variety of services to IMS subscribers.

For example, the application servers 217 can be used to perform originating call feature treatment functions on the calling party number received by the originating S-CSCF 206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 206 can submit queries to the ENUM system 230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE message to the terminating S-CSCF 214. The terminating S-CSCF 214 can then identify a terminating P-CSCF 216 associated with the terminating CD 202. The P-CSCF 216 may then signal the CD 202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 2 may be interchangeable. It is further noted that communication system 200 can be adapted to support video conferencing. In addition, communication system 200 can be adapted to provide the IMS CDs 201, 202 with the multimedia and Internet services of communication system 100 of FIG. 1.

If the terminating communication device is instead a PSTN CD such as CD 203 or CD 205 (in instances where the cellular phone only supports circuit-switched voice communications), the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD over the PSTN network 260 to enable the calling and called parties to engage in voice and/or data communications.

It is further appreciated that the CDs of FIG. 2 can operate as wireline or wireless devices. For example, the CDs of FIG. 2 can be communicatively coupled to a cellular base station 221, a femtocell, a WiFi router, a DECT base unit, or another suitable wireless access unit to establish communications with the IMS network 250 of FIG. 2. The cellular access base station 221 can operate according to common wireless access protocols such as Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), and so on. Other present and next generation wireless network technologies are contemplated by the subject disclosure. Accordingly, multiple wireline and wireless communication technologies are contemplated for the CDs of FIG. 2.

It is further contemplated that cellular phones supporting LTE can support packet-switched voice and packet-switched data communications and thus may operate as IMS-compliant mobile devices. In this embodiment, the cellular base station 221 may communicate directly with the IMS network 250 as shown by the arrow connecting the cellular base station 221 and the P-CSCF 216.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS and ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The media server 130 of FIG. 1 can be operably coupled to the second communication system 200 for purposes similar to those described above. It is further contemplated by the subject disclosure that media server 130 can perform function 162 and thereby provide media content services to the CDs 201, 202, 203 and 205 of FIG. 2. CDs 201, 202, 203 and 205, which can be adapted with software to perform function 172 to utilize the services of the media server 130. It is further contemplated that the media server 130 can be an integral part of the application server(s) 217 performing function 174, which can be substantially similar to function 16X and adapted to the operations of the IMS network 250.

Figure 3:
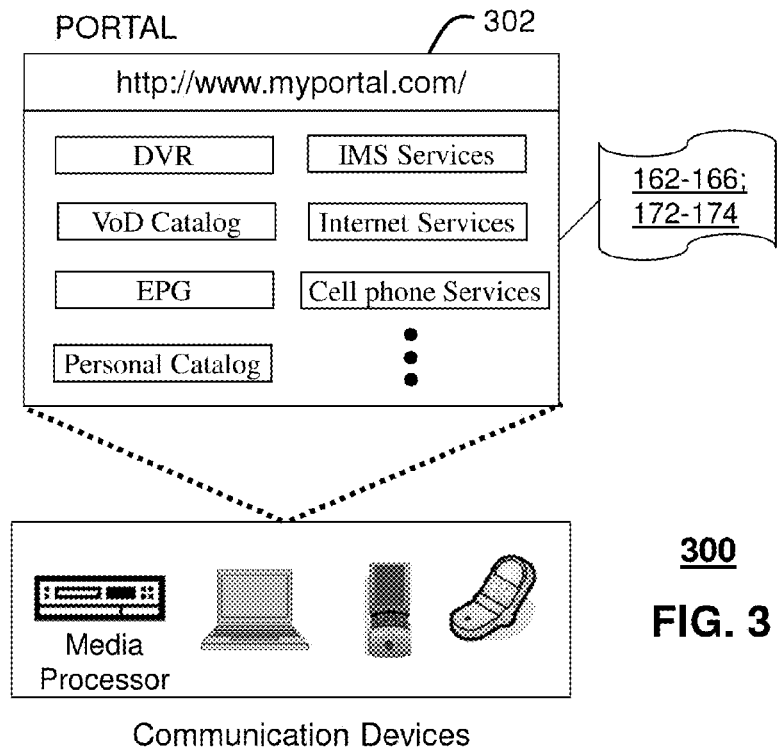
FIG. 3 depicts an illustrative embodiment of a web portal for interacting with the communication systems of FIGS. 1-2.

FIG. 3 depicts an illustrative embodiment of a web portal 302 which can be hosted by server applications operating from the computing devices 130 of the communication system 100 illustrated in FIG. 1. The web portal 302 can be used for managing services of communication systems 100-200. A web page of the web portal 302 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIGS. 1-2. The web portal 302 can be configured, for example, to access a media processor 106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 106. The web portal 302 can also be used for provisioning IMS services described earlier, provisioning Internet services, provisioning cellular phone services, and so on.

It is contemplated by the subject disclosure that the web portal 302 can further be utilized to manage and provision software applications 162-166, and 172-174, such as receiving and presenting media content, and to adapt these applications as may be desired by subscribers and service providers of communication systems 100-200.

Figure 4:
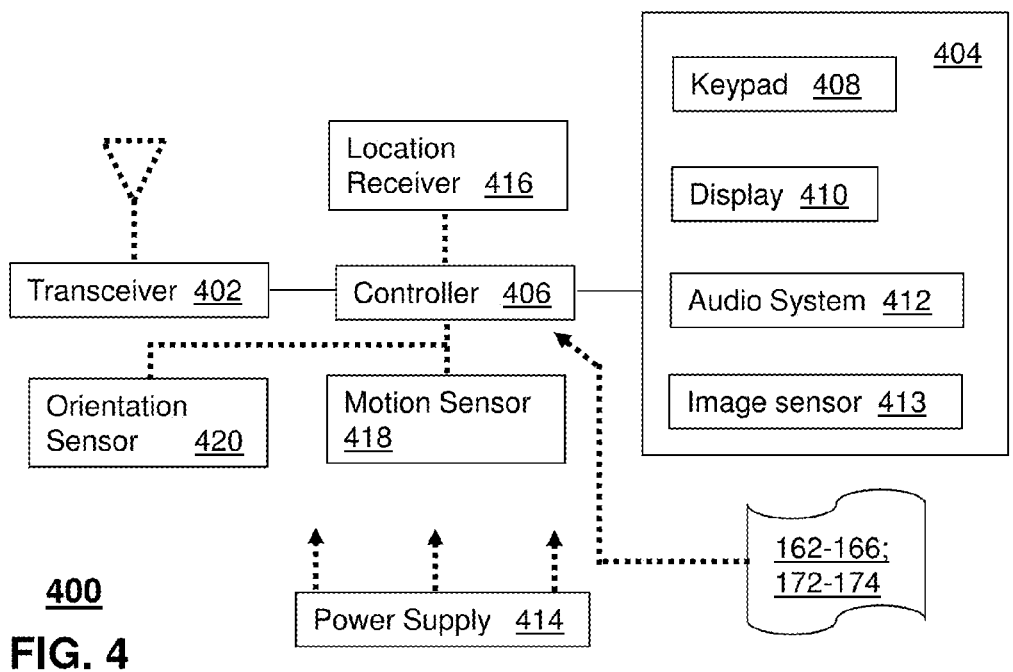
FIG. 4 depicts an illustrative embodiment of a communication device utilized in the communication systems of FIGS. 1-2.

FIG. 4 depicts an illustrative embodiment of a communication device 400. Communication device 400 can serve in whole or in part as an illustrative embodiment of the devices depicted in FIGS. 1-2. The communication device 400 can comprise a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features. The display 404 can include an array of display pixels for the presenting visual information and/or media content. The display pixels can color or monochromatic.

The display 410 can use touch screen technology to also serve as a user interface for detecting user input (e.g., touch of a user's finger). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect much surface area of a user's finger has been placed on a portion of the touch screen display. This sensing information can be used control the manipulation of the GUI elements.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port. The location receiver 416 can utilize common location technology such as a global positioning system (GPS) receiver capable of assisted GPS for identifying a location of the communication device 400 based on signals generated by a constellation of GPS satellites, thereby facilitating common location services such as navigation. The motion sensor 418 can utilize motion sensing technology such as an accelerometer, a gyroscope, or other suitable motion sensing to detect motion of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4. These variant embodiments are contemplated by the subject disclosure.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

It is contemplated by the subject disclosure that the communication device 400 shown in FIG. 4 or portions thereof can serve as a representation of one or more of the devices of communication systems 100-200. It is further contemplated that the controller 406 can be adapted in various embodiments to perform the functions 162-166 and 172-174, such as receiving and presenting media content.

Figure 5:
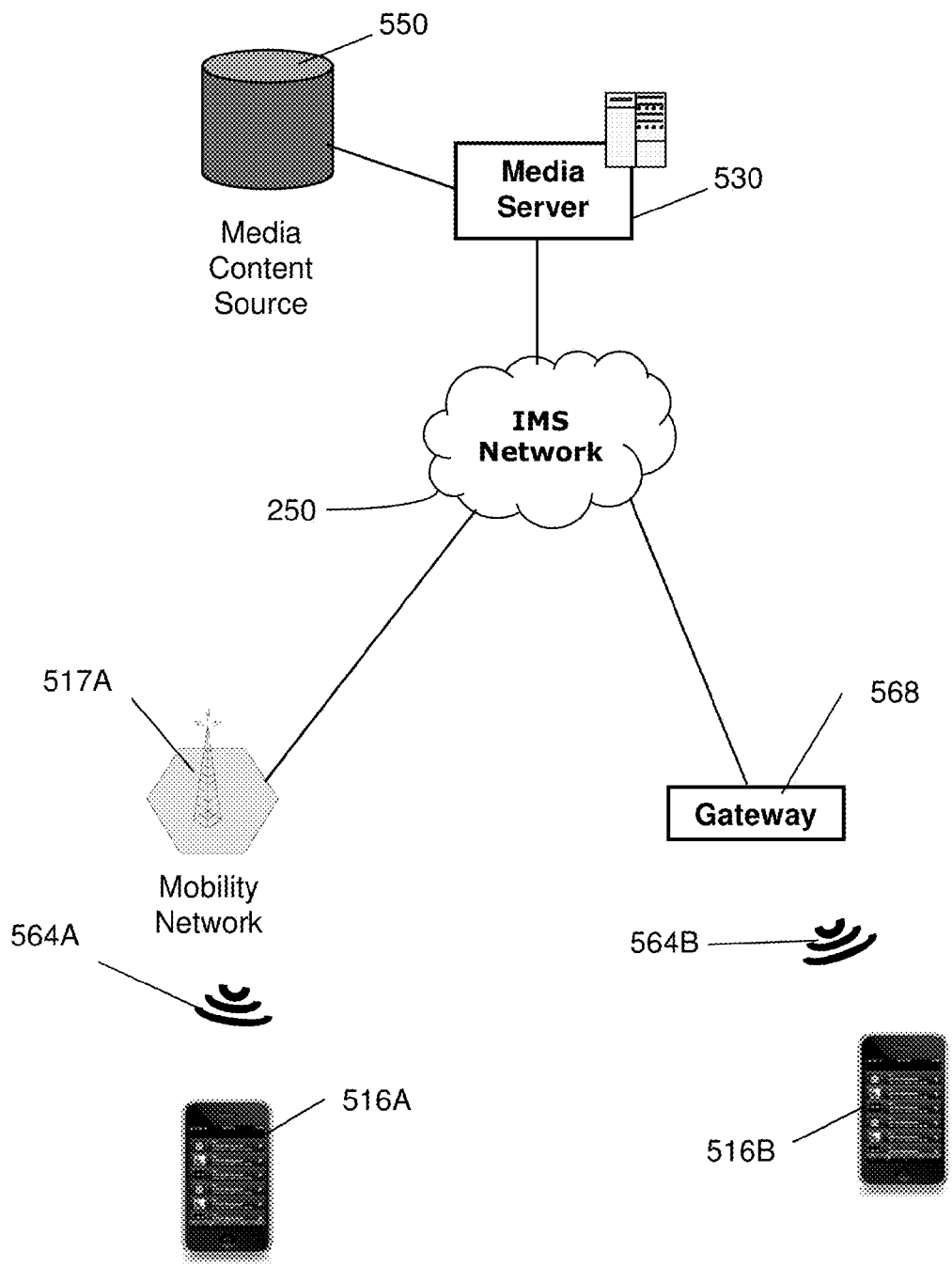
FIG. 5 depicts an illustrative embodiment of a communication system that performs a method for adapting media content for presentation.

FIG. 5 depicts an illustrative embodiment of a communication system that performs a method for adapting media content for presentation at a receiving device. System 500 can be overlaid or operably coupled to communication systems 100-200 as another representative embodiment of communication systems 100-200. System 500 can include a media server 530 in communication with a packet switched network such as IMS network 250. The media server 530 can be in communication with a wireless communication device 516A, such as mobile phone. The media server 530 can provide media content, by way of a media stream, to the wireless communication device 516A, which can be communicatively coupled to the IMS network 250 through base station 517A of a mobility network. For example, the wireless communication device 516A can communicate to the mobility network through a cellular communication technology link. In another embodiment, mobile communication devices 516B can receive streamed media content from the media server device 530 through a gateway 568.

The media server 530 can receive media content from a media content source 550. For example, the media content source can transmit media files and/or streams of media content to the media server 530 upon demand. The media content can include a sequence of digital video image frames. The image frames can further include image pixels that depict video content as discrete digital points. The image pixels can further include values for pixel color and/or intensity. The video image frames can be constructed from two-dimensional arrays of the image pixels. For example, each video image frame can be constructed from an array of X columns and Y rows of pixels. The total number of pixels in the two-dimensional array (X columns multiplied by Y rows) represents a resolution of each image frame. The media server 530 can encode the media content into a data stream, where the video and audio content of the media content is translated into a serial stream of data that a receiving device 516A can receive, buffer, and reconstruct into a sequence of video images and audio sounds. The receiving device 516A can then reproduce the media content using the display and audio systems of the device.

The media server 530 can provide media content to the receiving devices 516A at one or more video resolutions. However, different receiving device 516A and 516B can have different video resolution capabilities from one another and/or from the data stream of media content transmitted by the media server 530. With a large number of manufacturers and products, there is now a proliferation of receiving devices 516A and 516B available to consumers. With this proliferation has also come a proliferation of video display configurations, including displays of differing pixel resolutions and aspect ratios (ratios of display widths to display heights). While it is theoretically possible to provide a packet switched data streams to each receiving device 516A configured unique display pixel resolutions or configurations of each device 516A, this approach places a heavy burden on the media server. To alleviate this burden, while optimizing the performance of the receiving devices 516A, in one embodiment, a receiving device 516A can adapt a video image resolution of a transmitted data stream to a video display capability of the device 516A. By adapting the encoded transmission at the receiving devices 516A and 516B, processing demands on the media server 530 and bandwidth demands on the communication channels of the system 500 are reduced.

Figure 6:
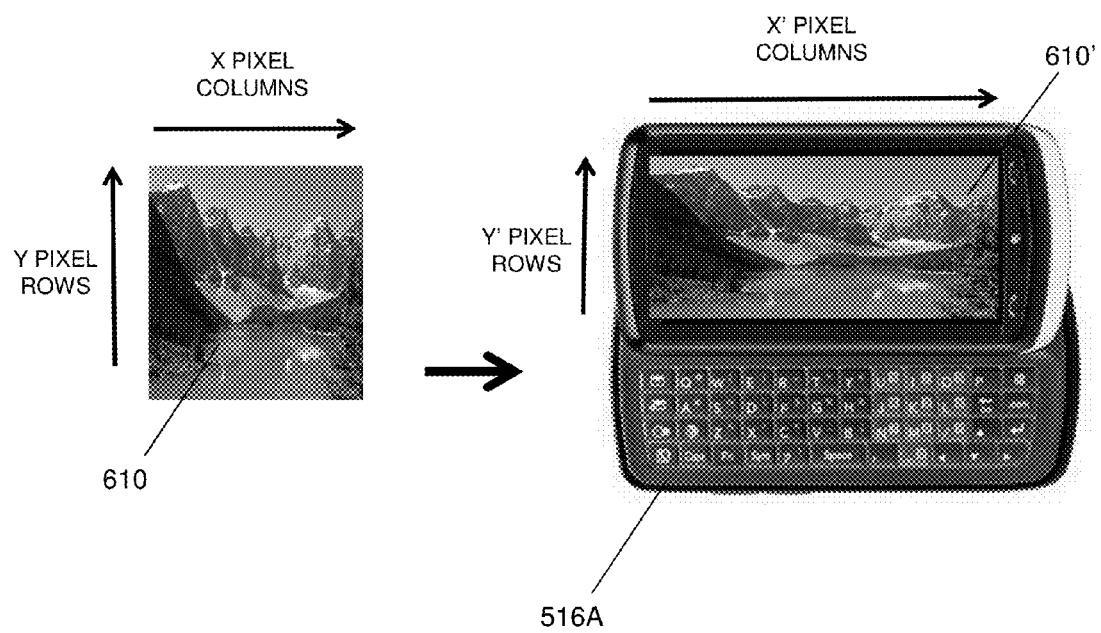
FIG. 6 depicts an illustrative embodiment of a mobile device presenting adapted media content.

The media server 530 can thereby provide streaming media content to the mobile communication devices 516A and 516B, and these receiving devices can adapt the received steams to accommodate the display capabilities of the devices according to the illustrative embodiments of the methods 700-1400 of FIGS. 7-14 and the illustrative embodiment of FIG. 6.

FIG. 6 depicts an illustrative embodiment 600 of a mobile device presenting adapted media content. Video image frames 610 can be transmitted to a receiving mobile device 620 over a communication system 500. The video image frames 610 can have a pixel resolution including X pixel columns and Y pixel rows. However, the display of the mobile device 516A can have a different pixel resolution 610' including X' pixel columns and Y' pixel rows. The transmitted video frames 610 can be adapted at the receiving device 516A to accommodate the display capabilities 610' of the mobile device 516A. In the illustrated embodiment, the display 610' includes a greater number of columns of pixels than each video image frame 610 but fewer rows of pixels than each video frame 610. Alternatively, the display 610' can include fewer columns, more rows, or have the same number of columns and same number of rows as each image frame. Where the display has a greater number of pixel locations (rows or columns) than the received image frames, the mobile communication device 516A can perform an expansion of the received image frame data to generate additional display pixels prior to presentation at the display of the device. Where the display has fewer pixel locations than the received image frames, then the mobile communication device 516A can perform a reduction of the received image frame data to remove unneeded display pixels, while conserving video data, prior to presentation at a display of the device.

Figure 7:
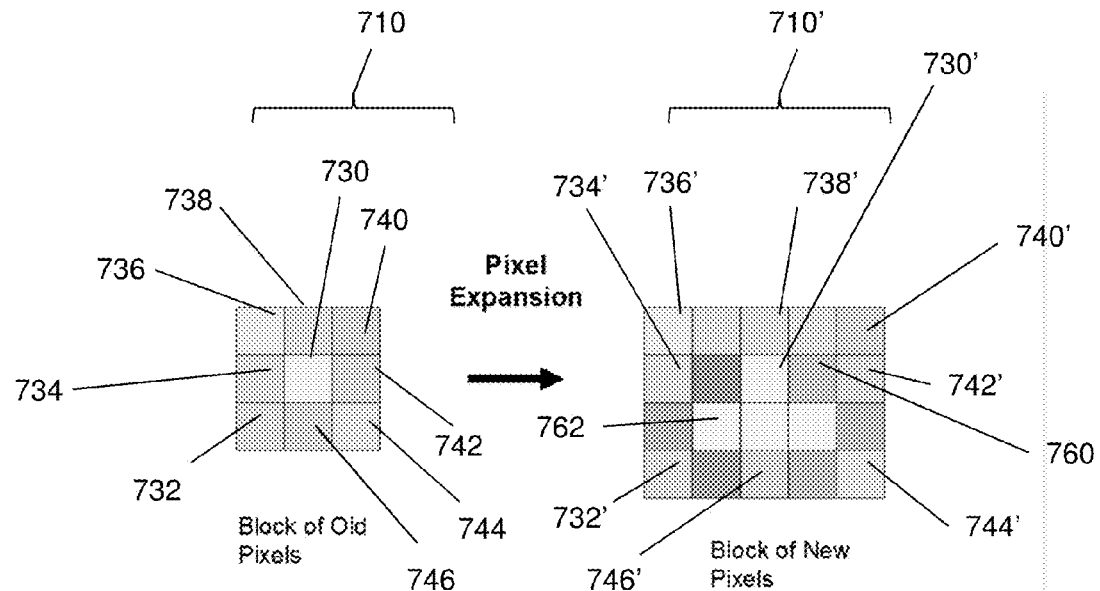
FIG. 7 depicts an illustrative embodiment of adapting media content by pixel expansion.

FIG. 7 depicts an illustrative embodiment of a method 700 for adapting media content by pixel expansion. In one embodiment, video frames of the media content can be received by the mobile communication device 516A from the media server 530. In one embodiment, the received video frames contain fewer pixels than are available at the display of the mobile device 516A such that the received pixels must be expanded to fit the display. For example, a portion 710 of the received video frame can contain image pixels 730-746, as shown, that must be expanded to cover a portion 710' of the display at the receiving device 516A that is made up of a greater number of pixels 730'-746', 760, and 762. In one embodiment, value for individual image pixels 730-746 of the video frame 710, such as color or intensity, can be mapped directly to pixel locations 730'-746' at the display 710'. Each of the mapped display pixels 730'-746' of the display portion 710' can be paired with an image pixel 730-746 from the video frame portion 710 to create mapped pairs, such as image pixel 730 and display pixel 730'. In addition, each mapped display pixel 730' can be assigned one or more values associated with its mapped image pixel 730.

However, the direct mapping of the image pixels 730-746 to the display portion 710' can result in many locations of unmapped display pixels 760 and 762 in the display portion 710', where image pixel data has not been assigned. These unmapped display pixels 760 and 762 cannot remain blank or at default pixel values because the resulting display image would appear to be incomplete. Hence, in one embodiment, for each unmapped display pixel 760 and 762, a number of mapped display pixels 730'-746' are identified that are adjacent to the unmapped display pixel. For example, mapped display pixels 730', 732', 734', and 746' are adjacent to unmapped display pixel 762. Each of the adjacent mapped display pixels 730', 732', 734', and 746' can be paired with an image pixel 730, 732, 734 and 746 from the video frame 710 and can be assigned one or more values associated with its mapped image pixel 730, 732, 734 and 746. In one embodiment, the mapped values of the adjacent mapped display pixels 730', 732', 734', and 746' can be statistically compiled to generate a blended mapped value. In one embodiment, the mapped values of the adjacent mapped display pixels 730', 732', 734', and 746' can be averaged to generate the blended mapped value. In one embodiment, the blended mapped value can be assigned to the unmapped display pixel 762. This process of generating blended mapped values from adjacent mapped display pixels can be repeated to assign blended mapped values to all of the unmapped display pixels 760 and 762 in the display frame portion 710'.

Figure 8:
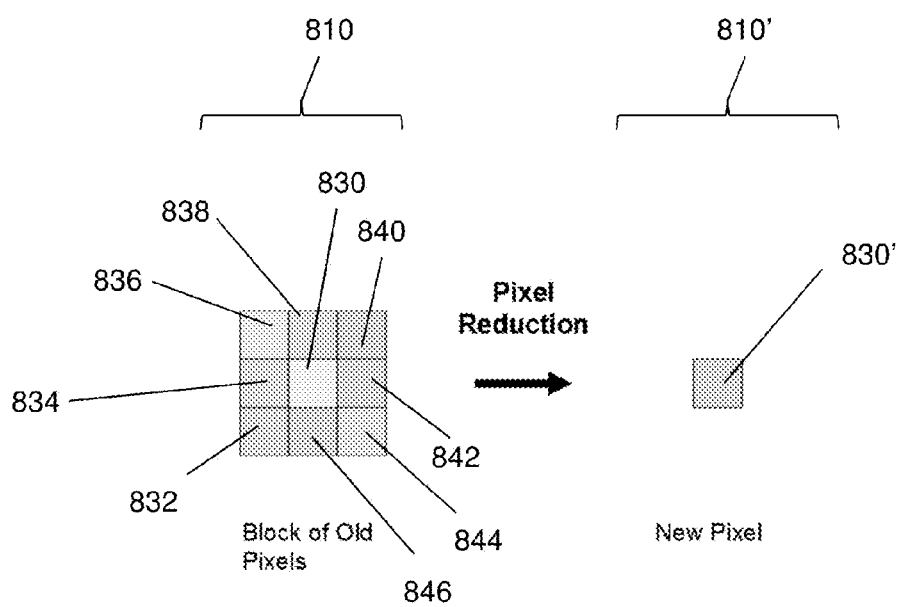
FIG. 8 depicts an illustrative embodiment of adapting media content by pixel reduction.

FIG. 8 depicts an illustrative embodiment of a method 800 for adapting media content by pixel reduction. In one embodiment, the received video frames contain a greater number of pixels than are available at the display of the mobile device 516A, such that the received pixels must be expanded to fit the display. For example, a portion 810 of the received video frames can contain several image pixels 830-846, as shown, that must be reduced to cover a portion 810' of the display at the receiving device 516A that is made up of a single pixel 830'. In one embodiment, values for individual image pixels 830-846 of the video frame portion 810, such as color or intensity, can be mapped directly to pixel locations at the display 810'. Each of the mapped display pixels can be paired with an image pixel 830-846 from the video frame portion 810 to create mapped pairs. In addition, each mapped display pixel can be assigned one or more values associated with its mapped image pixel 830.

In one embodiment, a single image pixel 830 is directly mapped to a display pixel 830' in the display portion 810'. However, the remaining image pixels 832-846 are unmapped. In one embodiment, there are many locations of unmapped image pixels 832-846 in the image portion 810, where image pixel data has not been mapped. The image data of these unmapped image pixels 832-846 will be lost if this data is not somehow mapped to the display portion 810'. Hence, in one embodiment, unmapped image pixels 832-846 that are adjacent to the mapped image pixel can be identified. For example, unmapped image pixels 832'-846' can be found to be adjacent to the mapped image pixel 830. In one embodiment, the values of the adjacent unmapped image pixels 830-846 can be statistically compiled to generate a blended unmapped value. In one embodiment, the values of the adjacent unmapped image pixels 832-846 can be averaged to generate the blended unmapped value. In one embodiment, the blended unmapped value can be assigned to the unmapped display pixel 830'. This process of generating blended unmapped values from adjacent unmapped image pixels can be repeated to assign blended unmapped values to all of the mapped display pixels 830' in the display frame 810.

Figure 9:
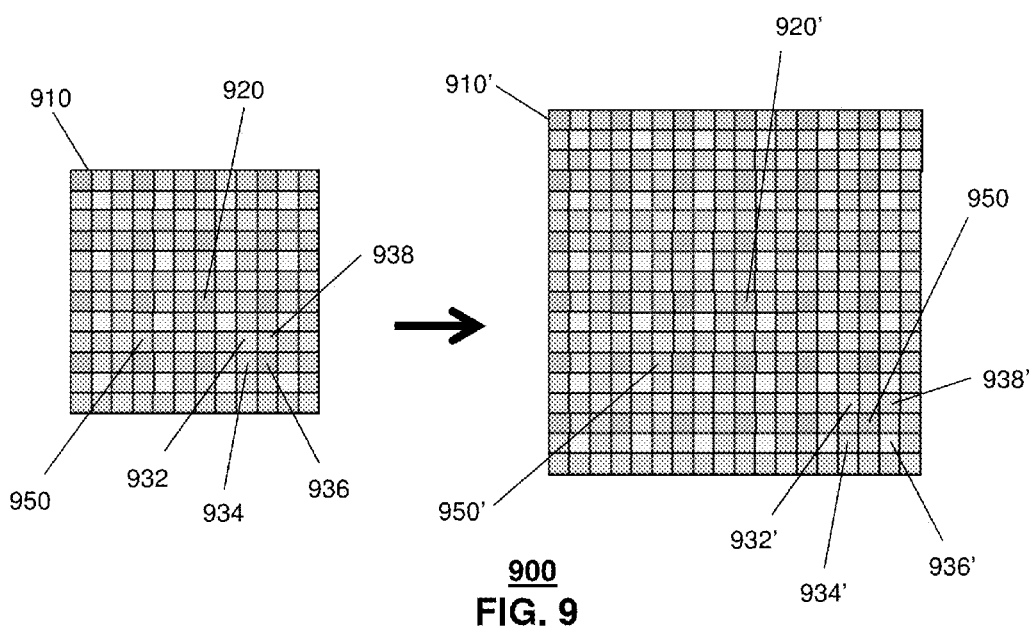
FIGS. 9-10 depict illustrative embodiments of pixel expansion and reduction with center of image and center of display referencing.
Figure 10:
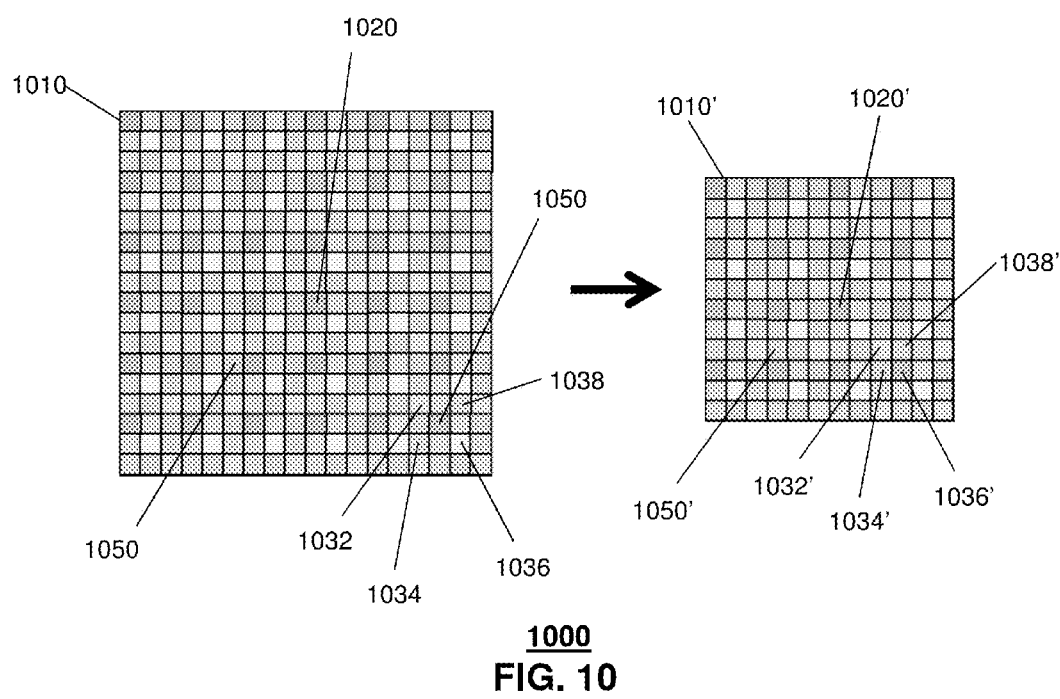
Figure 11:
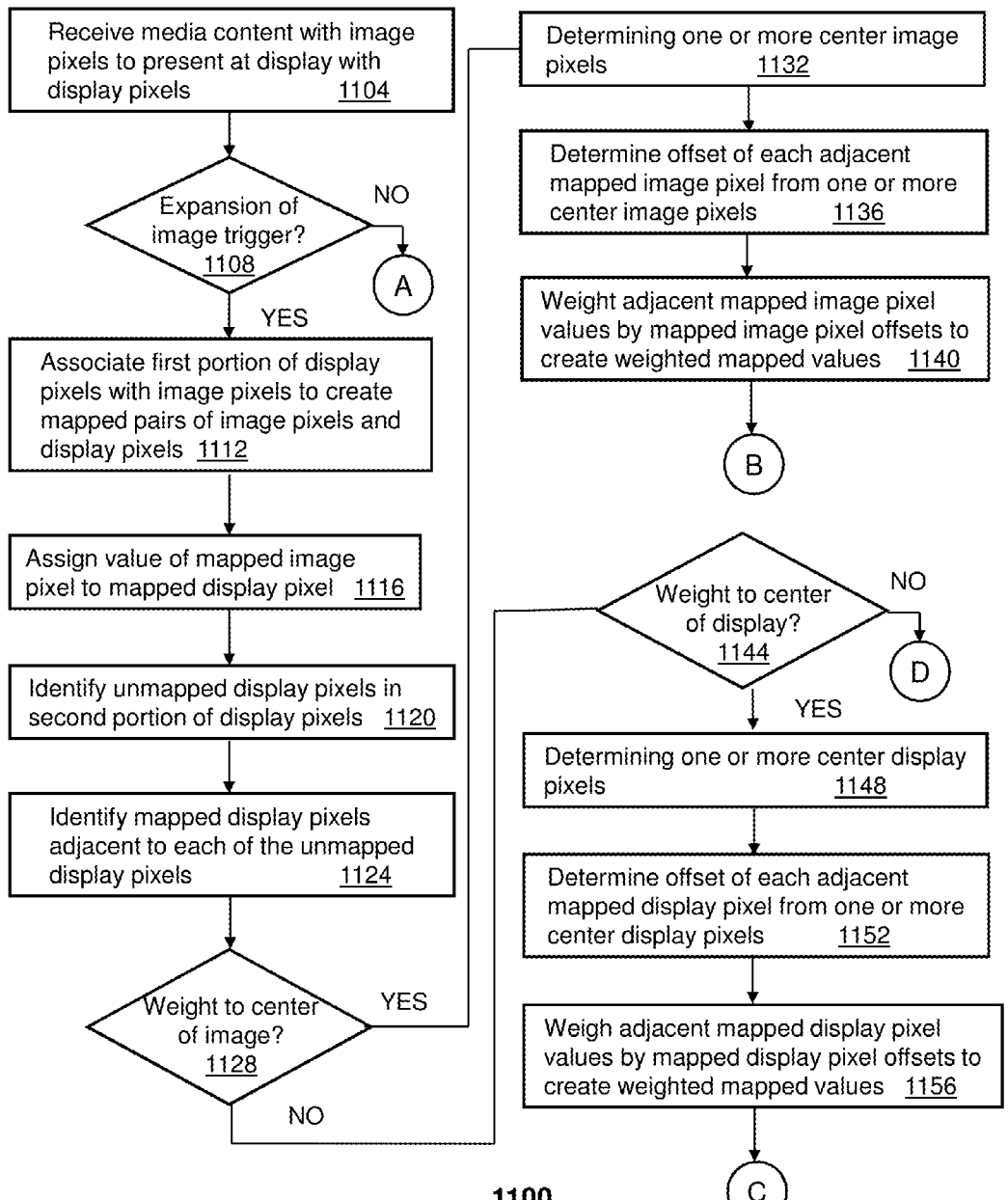
FIGS. 11-14 depicts an illustrative embodiment of methods for pixel expansion and pixel reduction operating in portions of the systems described in FIGS. 1-6 and further illustrated in FIGS. 7-10.
Figure 12:
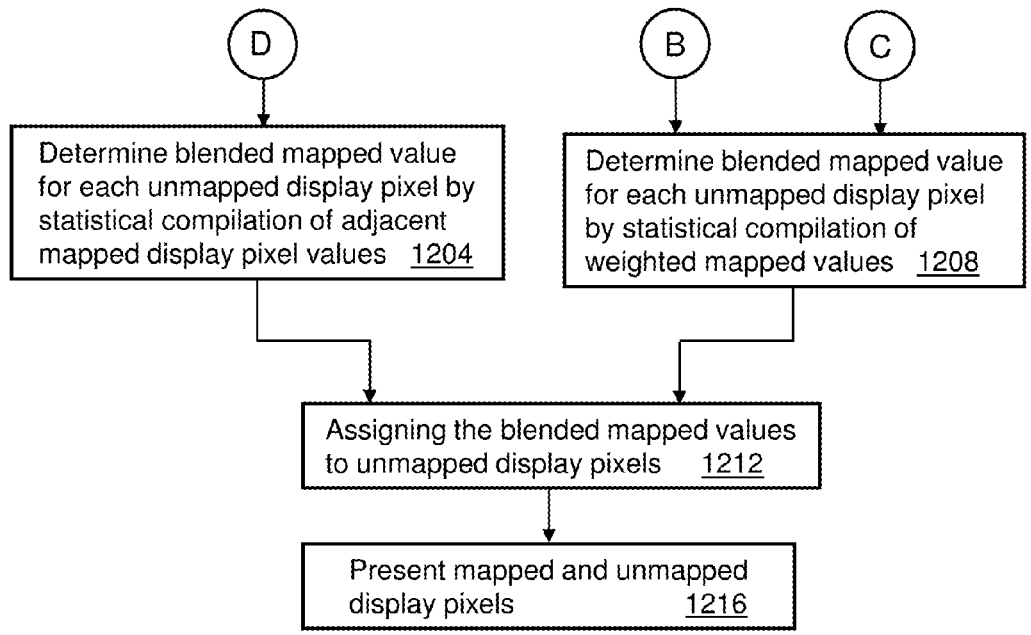
Figure 13:
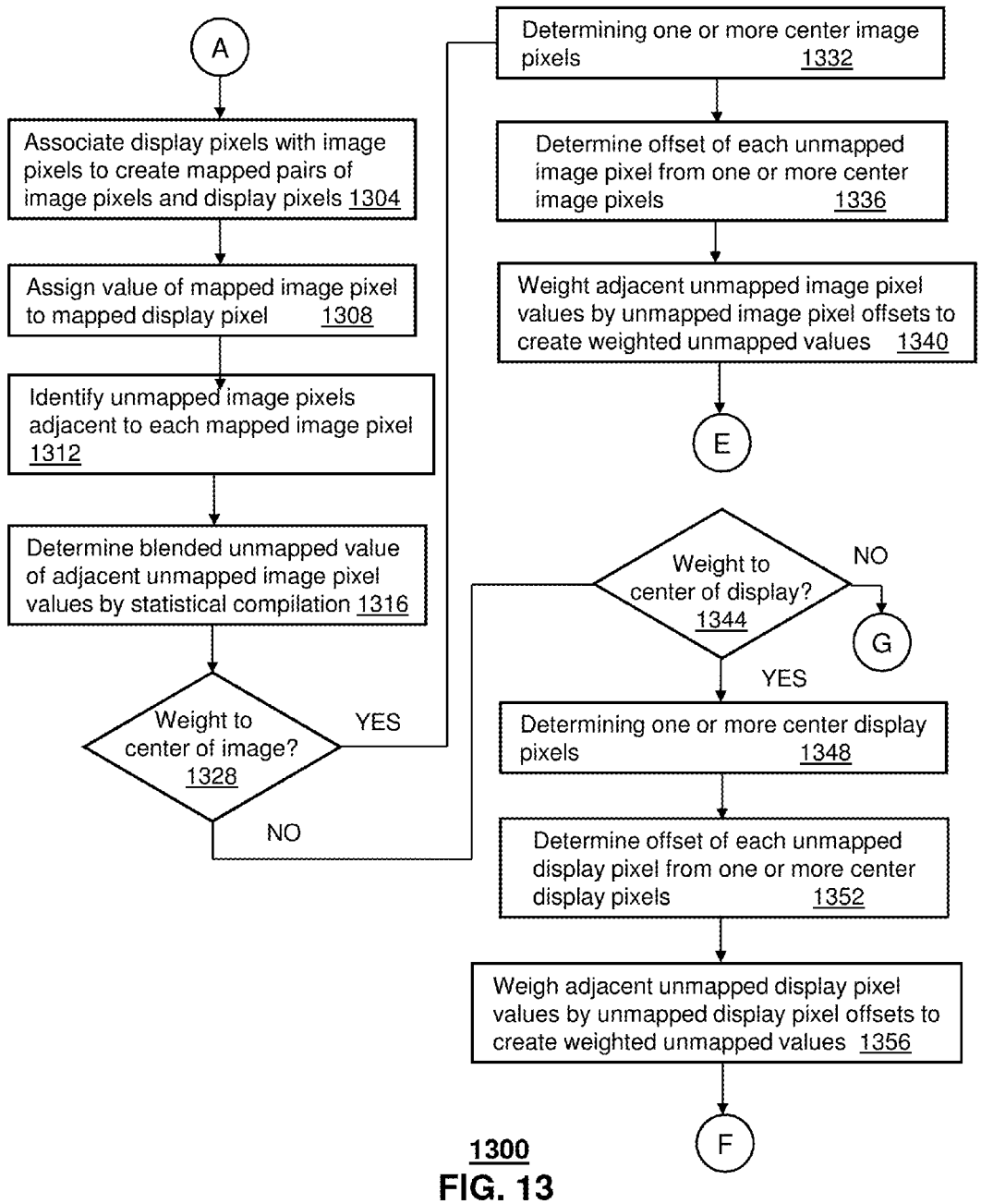
Figure 14:
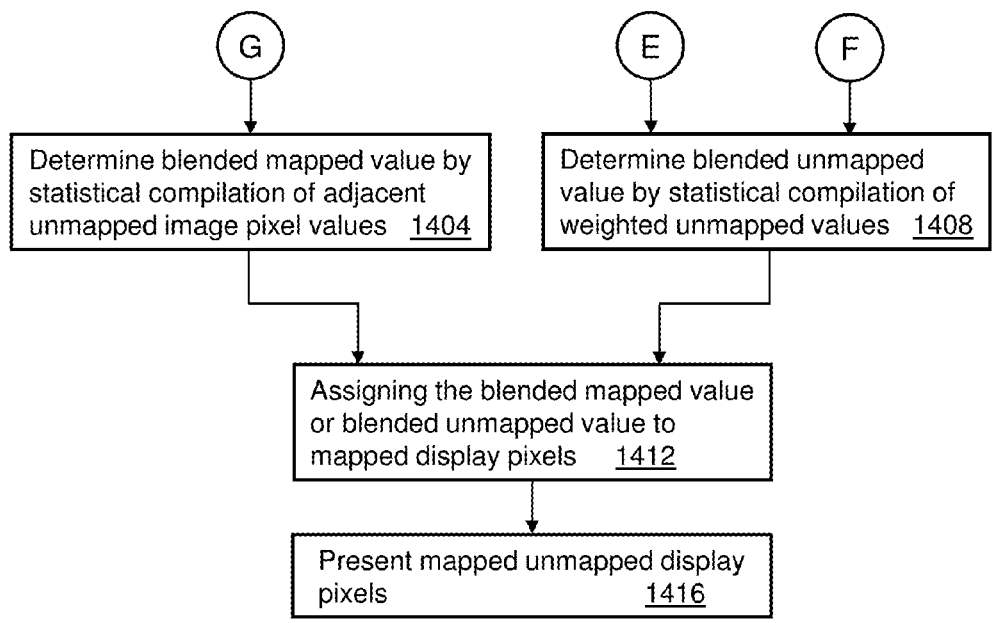

FIGS. 9-10 depict illustrative embodiments for pixel expansion and/or reduction based upon referencing to a center of image or a center of display. Referring particularly to FIG. 9, in one embodiment, a frame 910 of image pixels can be expansion mapped to a frame 910' of display pixels. In one embodiment, a frame 910 of mapped image pixels 932-938 can be directly mapped to the display frame 910' of display pixels 932'-938'. A blended mapped value can be assigned to an unmapped display pixel 950 by blending the values of mapped display pixels 932'-938' that are adjacent to the unmapped display pixel 950. In one embodiment, the values of mapped display pixels 932'-938' can be weighted according to their distances from a reference location. In one embodiment, the values of mapped display pixels 932'-938' can be weighted according to the distance of paired mapped image pixels 932-938 to one or more image pixels 920 identified as the center of the frame image 910. In this center of image referencing, the adjacent mapped display pixels 932'-938' can be weighted more heavily if their mapped pair image pixels 932-938 are closer to the image center 920. In one embodiment, an offset from the image center pixel can be determined for each mapped image pixel pair, and the image center offset can be used for weighting to the adjacent mapped display pixel values in calculating the blended mapped value. In one embodiment, an alternative (non-centered) frame image reference 950 can be used. For example, the positions of the mapped image pixels 932-938 can be compared to the alternative reference location 950 to determined offsets for value weighting.

In one embodiment, the locations of the adjacent mapped display pixels 932'-938' can be compared to one or more pixels 920' at the center of the display frame 910'. This center of display referencing can be used to determine location offsets from center of display for each of the mapped display pixels 932'-938'. The values of the mapped display pixels 932'-938' can then be weighted according to their offsets, and the resulting weighted values used for calculating the blended mapped value that is assigned to the unmapped display pixel 950.

Referring particularly to FIG. 10, in one embodiment, a frame 1010 of image pixels can be reduction mapped to a frame 1010' of display pixels. In one embodiment, a portion of mapped image pixels 1032-1038 can be directly mapped to display pixels 1032'-1038'. However, unmapped image pixel 1050 is not mapped to the display frame 1010'. Instead, a blended unmapped value is determined from the values of image pixels 1032-1038, which are adjacent to the unmapped display pixel 1050. In one embodiment, the values of image pixels 1032'-1038' can be weighted according to their distances from a reference location. In one embodiment, the values of image pixels 1032'-1038' can be weighted according to the distance of the image pixels 1032-1038 to one or more image pixels 1020 identified as the center of the frame image 1010. In this center of image referencing, the adjacent image pixels 1032'-1038' can be weighted more heavily if they are closer to the image center 1020. In one embodiment, an offset from the image center pixel can be determined for each image pixel, and the image center offset can be used for weighting to the adjacent image pixel values for calculating the blended unmapped value. In one embodiment, an alternative (non-centered) frame image reference 1050 can be used. For example, the positions of the adjacent image pixels 1032-1038 can be compared to the alternative reference location 1050 to determined offsets for value weighting.

In one embodiment, the locations of adjacent mapped display pixels 1032'-1038' can be compared to one or more pixels 1020' at the center of the display frame 1010'. This center of display referencing can be used to determine location offsets from center of display for each of the mapped display pixels 1032'-1038'. The values of the mapped display pixels 1032'-1038' can then be weighted according to their offsets, and the resulting weighted values used for calculating the blended unmapped value that is assigned to the unmapped display pixel 1050.

FIGS. 11-14 depicts illustrative embodiments of methods for pixel expansion and pixel reduction operating in portions of the systems described in FIGS. 1-6 and further illustrated in FIGS. 7-10. Method 1100 can begin with step 1104 in which a receiving device 516A can receive media content from a media server 530. In one embodiment, the media content can be delivered as a data stream or series of data streams. In one embodiment, the media content can be delivered as a file or series of files. In one embodiment, the media content can include video that further can include digital image frames representing the digital images of the media content. In one embodiment, the digital image frames can include a two-dimensional array of image pixels. In one embodiment, the image pixels can include values for intensity and/or color. In one embodiment, the receiving device 516A can receive the media content over a network link. In one embodiment, the device 516 can receive the media content over a wireless link, such as a cellular link.

In step 1108, the receiving device 516A can determine if an expansion of image has been triggered. In one embodiment, the expansion of image can be triggered by the receiving device 516A sensing that the incoming video frames contain fewer pixels than display frames associated with the receiving device 516A. In one embodiment, the receiving device 516A can determine if a video expansion is required by comparing received media content image frame information to stored information including any combination of information about display resources and/or display configurations at the receiving device. In one embodiment, the receiving device 516A can compare received image frames to display frames and can detect a mismatch in column and/or row requirements. For example, the receiving device 516A can detect a need for an expansion of image by determining that the received video frames include a lessor number of columns or a lessor number of rows of pixels than have been included in the display frame.

In step 1112, if the receiving device 516A detects a need to expand the image pixels, then the receiving device 516A can associate a first portion of the display frame display pixels with image pixels of the image frame to create mapped pairs. The mapped pairs can each include an image pixel and a display pixel. In step 1116, the receiving device 516A can assign one or more values of the mapped image pixel to the mapped display pixel. In step 1120, the receiving device 516A can identify one or more unmapped display pixels, where the values of the unmapped display pixels are not assigned. In step 1124, the receiving device 516A can, for each identified unmapped display pixel, further identify mapped display pixels that are adjacent to the unmapped display pixels.

In step 1128, the receiving device 516A can determine if the receiving device 516A is configured to weight the expanded image to the center of the image frame. If the receiving device 516A determines that it is not configured to weight to the center of the image, then it can determine if it is configured to weight to the center of the display frame in step 1144. If weighting to the center of the image is used, then, in step 1132, the receiving device 516A can determine a location in the image frame of one or more center image pixels. In step 1136, the receiving device 516A can determine an offset from the image center for each of the adjacent mapped image pixels. In step 1140, the receiving device 516A can weight, or adjust, the adjacent mapped image pixel values by the mapped image pixel offsets from the image center to generate weighted mapped values for each adjacent mapped image pixel.

If weighting to the center of the display is used, then, in step 1148, the receiving device 516A can determine a location in the display frame of one or more center display pixels. In step 1152, the receiving device 516A can determine an offset from the display center for each of the adjacent mapped display pixels. In step 1156, the receiving device 516A can weight, or adjust, the adjacent mapped display pixel values by the mapped display pixel offsets from the display center to generate weighted mapped values for each adjacent mapped display pixel.

If weighting either to the center of the image or to the center of the display is used, then, in step 1208, the receiving device 516A can determine a blended mapped value for each unmapped display pixel by statistical compilation of the weighted mapped values. If weighting to the center is not used, then, in step 1204, the receiving device 516A can determine a blended mapped value for each unmapped display pixel by statistical compilation of the adjacent mapped display pixel values. In one embodiment, the statistical compilation can be an average or mean of the compiled weighted mapped values or the adjacent mapped display pixel values. In step 1212, the receiving device 516A can assign the blended mapped values to the unmapped display pixels. In step 1216, the receiving device 516A can present the mapped and unmapped display pixels at a display of the receiving device 516A.

If the receiving device 516A does not detect a need to expand the image pixels, then the receiving device 516A can determine that it needs to reduce the image pixels, in step 1304, and can associate the display frame display pixels with the image pixels of the image frame to create mapped pairs. The mapped pairs can each include an image pixel and a display pixel. In step 1308, the receiving device 516A can assign one or more values of the mapped image pixel to the mapped display pixel. In step 1312, the receiving device 516A can identify one or more unmapped image pixels, where the values of the unmapped image pixels are not assigned to any of the display pixels. In step 1316, the receiving device 516A can determine blended unmapped values for the adjacent unmapped image pixel values by statistical compilation.

In step 1328, the receiving device 516A can determine if the receiving device is configured to weight the reduced image to the center of the image frame. If the receiving device 516A determines that it is not configured to weight to the center of the image, then it can determine if it is configured to weight to the center of the display frame in step 1344. If weighting to the center of the image is used, then, in step 1332, the receiving device 516A can determine a location in the image frame of one or more center image pixels. In step 1336, the receiving device 516A can determine an offset from the image center for each of the adjacent unmapped image pixels. In step 1340, the receiving device 516A can weight, or adjust, the adjacent unmapped image pixel values by the mapped image pixel offsets from the image center to generate weighted unmapped values for each adjacent unmapped image pixel.

If weighting to the center of the image is used, then, in step 1348, the receiving device 516A can determine a location in the display frame of one or more center display pixels. In step 1352, the receiving device 516A can determine an offset from the display center for each of the adjacent unmapped display pixels, if applicable. In step 1356, the receiving device 516A can weight, or adjust, the adjacent unmapped display pixel values by the mapped display pixel offsets from the display center to generate weighted unmapped values for each adjacent unmapped display pixel.

If weighting to the center of the image or to the center of the display is used, then, in step 1408, the receiving device 516A can determine a blended unmapped value for each unmapped display pixel by statistical compilation of the weighted unmapped values. If weighting to the center is not used, then, in step 1404, the receiving device 516A can determine a blended unmapped value for each unmapped display pixel by statistical compilation of the adjacent unmapped display pixel values. In one embodiment, the statistical compilation can be an average or mean of the compiled weighted unmapped values or the adjacent unmapped pixel values. In step 1412, the receiving device 516A can assign the blended unmapped values to the unmapped display pixels. In step 1416, the receiving device 516A can present the mapped and unmapped display pixels at a display of the receiving device 516A.

Upon reviewing the aforementioned embodiments, it would be evident to an artisan with ordinary skill in the art that said embodiments can be modified, reduced, or enhanced without departing from the scope and spirit of the claims described below. In one embodiment, the media server 130 can determine the configuration to the display of the receiving device 516A and send the media content partially or completely adapted to the pixel resolution of the display. In one embodiment, a proxy server can receive the media content from the media server 130, determine the configuration to the display of the receiving device 516A, and send the media content partially or completely adapted to the pixel resolution of the display. In one embodiment, the center of the display can be configured by user input at the receiving device 516A. In one embodiment, the method of adapting the media content for presentation at the receiving device 516A can be performed by a video processor device. In one embodiment, the receiving device 516A can configure portions of the display for presentation of the media content while reserving portions of the display for other purposes, such as presentation of second media content, user interface graphics, or informational graphics.

Figure 15:
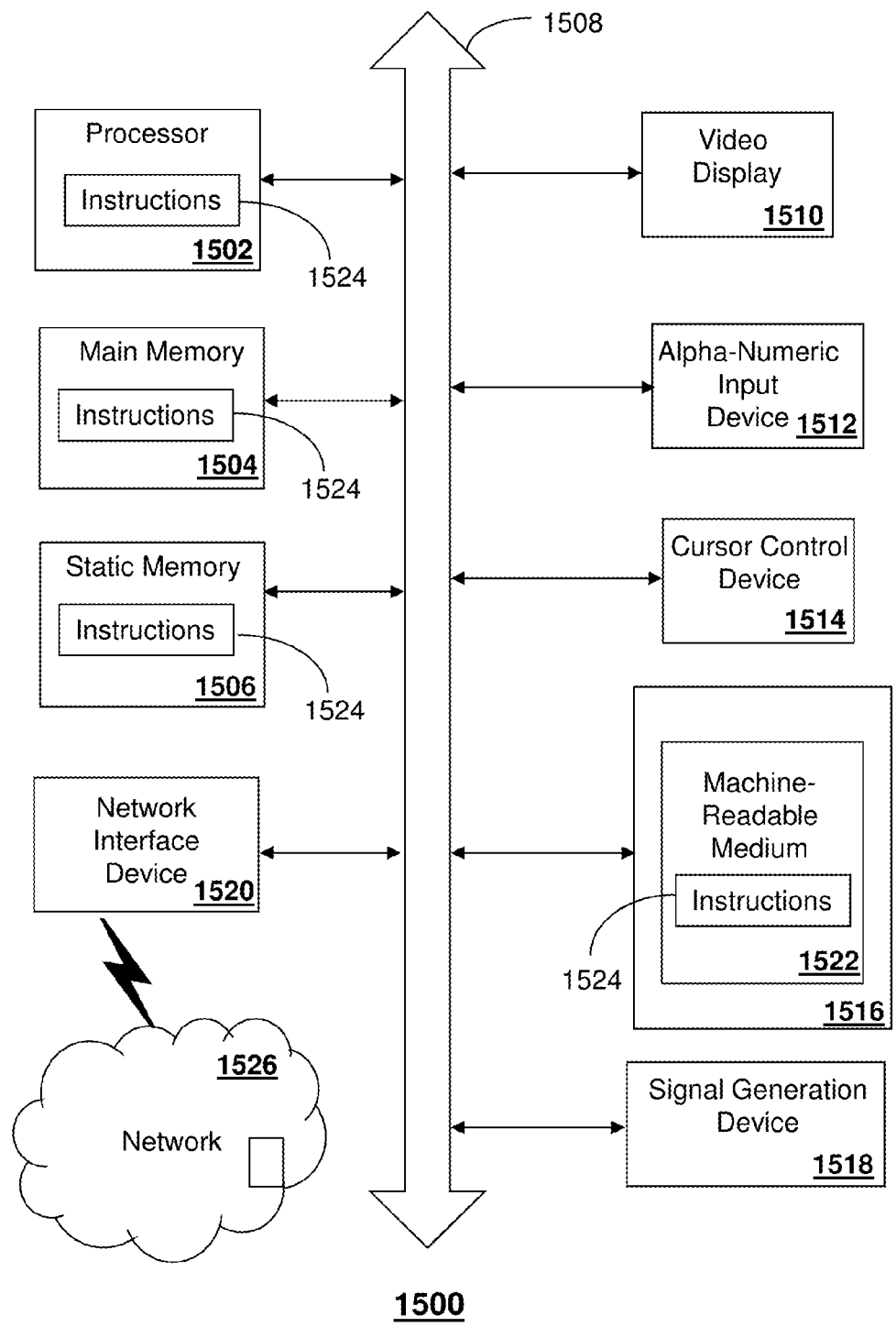
FIG. 15 is a diagrammatic representation of a machine in the form of a computer system within which a set of instructions, when executed, may cause the machine to perform any one or more of the methods described herein.

FIG. 15 depicts an exemplary diagrammatic representation of a machine in the form of a computer system 1500 within which a set of instructions, when executed, may cause the machine to perform any one or more of the methods discussed above. One or more instances of the machine can operate, for example, as the media server 130, the media processor 106, and/or the wireless communication device 116 and other devices of FIGS. 1-6. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor 1502 (e.g., a central processing unit (CPU), a graphics processing unit (GPU, or both), a main memory 1504 and a static memory 1506, which communicate with each other via a bus 1508. The computer system 1500 may further include a video display unit 1510 (e.g., a liquid crystal display (LCD), a flat panel, or a solid state display. The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
   a display comprising a plurality of display pixels corresponding to a plurality of display pixel columns and a plurality of display pixel rows;
   a memory storing computer instructions; and
   a processor coupled to the memory and the display, wherein the processor responsive to executing the computer instructions performs operations comprising:
   receiving media content comprising a plurality of image pixels corresponding to a plurality of image pixel columns and a plurality of image pixel rows;
   determining that the plurality of display pixel columns is greater than the plurality of image pixel columns and that the plurality of display pixel rows is not greater than the plurality of image pixel rows to identify a column expansion;
   responsive to identifying the column expansion, associating a first portion of the plurality of display pixels with the plurality of image pixels to create a plurality of mapped pairs each comprising a mapped image pixel of a plurality of mapped image pixels and a mapped display pixel of a plurality of mapped display pixels;
   for each mapped pair of the plurality of mapped pairs, assigning a value associated with the mapped image pixel to the mapped display pixel, wherein the value comprises one of a color value, an intensity value, or combinations thereof;
   identifying a second portion of the plurality of display pixels as a plurality of unmapped display pixels, and, for each unmapped display pixel of the plurality of unmapped display pixels:
   identifying as a plurality of adjacent mapped display pixels a portion of the plurality of mapped display pixels that are adjacent to the unmapped display pixel;
   determining a center display pixel of the plurality of display pixels, wherein the center display pixel corresponds to a center of gravity of the display pixels;
   for each adjacent mapped display pixel of the plurality of adjacent mapped display pixels:
   determining an offset between the center display pixel and the adjacent mapped display pixel to generate a center offset for the adjacent mapped display pixel; and
   weighting the value that is assigned to the adjacent mapped display pixel according to the center offset of the adjacent mapped display pixel to generate a weighted mapped value for the adjacent mapped display pixel; and
   averaging a plurality of weighted mapped values of the plurality of adjacent mapped display pixels to generate a blended mapped value; and
   assigning the blended mapped value to the unmapped display pixel, wherein the assigning of the value associated with the mapped image pixel to the mapped display pixel for each of the plurality of mapped pairs and the assigning of the blended mapped value to the unmapped display pixel for each adjacent mapped display pixel expands the plurality of image pixel columns to fit the plurality of display pixel columns; and
   presenting the plurality of mapped display pixels and the plurality of unmapped display pixels at the display.

2. The mobile device of claim 1, wherein the operations further comprise determining that the plurality of display pixel rows is less than the plurality of image pixel columns to identify a row reduction, wherein the mapped display pixels and the unmapped display pixels are assigned to plurality of display pixel rows.

3. The mobile device of claim 1, wherein the operations further comprise:
   determining a center image pixel of the plurality of image pixels;

for each adjacent mapped display pixel of the plurality of adjacent mapped display pixels:
  identifying a mapped image pixel associated with the adjacent mapped display pixel; and
  determining an offset between the center image pixel and the mapped image pixel associated with the adjacent mapped display pixel to generate an image center offset for the adjacent mapped display pixel,
  wherein the weighting of the value that is assigned to the adjacent mapped display pixel to generate the weighted mapped value for the adjacent mapped display pixel is further determined according to the image center offset of the adjacent mapped display pixel.

4. The mobile device of claim 3, wherein the value that is assigned to the adjacent mapped display pixel is weighted more heavily as the offset between the center image pixel and the mapped image pixel becomes smaller.

5. The mobile device of claim 1, wherein the value that is assigned to the adjacent mapped display pixel is weighted more heavily as the offset between the center display pixel and the adjacent mapped display pixel becomes smaller.

6. The mobile device of claim 1, wherein the operations further comprise offsetting the center display pixel according to a configurable center offset.

7. A non-transitory computer-readable storage medium, comprising computer instructions, which, responsive to being executed by a processor, cause the processor to perform operations comprising:
  receiving media content at a communication device comprising a plurality of image pixels corresponding to a plurality of image pixel columns and a plurality of image pixel rows;
  determining that a plurality of display pixel columns of a display is less than the plurality of image pixel columns and that a plurality of display pixel rows of the display is not less than the plurality of image pixel rows to identify a column reduction;
  determining a center display pixel of a plurality of display pixels; and
  responsive to the column reduction, associating the plurality of display pixels of the display with the plurality of image pixels to identify a plurality of mapped pairs each comprising a mapped image pixel of a plurality of mapped image pixels and a mapped display pixel of a plurality of mapped display pixels, and, for each mapped pair of the plurality of mapped pairs:
    identifying as a plurality of adjacent image pixels a portion of the plurality of image pixels that are adjacent to the mapped image pixel of the mapped pair;
    for each adjacent image pixel of the plurality of adjacent image pixels, accessing a value associated with the adjacent image pixel to generate a plurality of unmapped values;
    for each unmapped value of the plurality of unmapped values:
      determining an offset from the center display pixel and the mapped display pixel of the plurality of mapped display pixels that is associated with the mapped image pixel to generate a center offset for the mapped image pixel; and
      weighting the unmapped value that is associated with the adjacent image pixel according to the center offset to generate a weighted unmapped value for the adjacent image pixel; determining a blended mapped value according to a statistical compilation of a plurality of weighted unmapped values of the plurality of adjacent image pixels; and
    assigning the blended mapped value to the mapped display pixel associated with the mapped image pixel in the mapped pair, wherein the plurality of mapped display pixels reduces the plurality of image pixel columns to fit the plurality of display pixel columns; and
  presenting the plurality of mapped display pixels at the display.

8. The non-transitory computer-readable storage medium of claim 7, wherein the operations further comprise determining that the plurality of display pixel rows is greater than the plurality of image pixel columns to identify a row expansion.

9. The non-transitory computer-readable storage medium of claim 7, wherein the value associated with the adjacent image pixel comprises one of a color value, an intensity value, or a combination thereof.

10. The non-transitory computer-readable storage medium of claim 7, wherein the operations further comprise averaging the plurality of unmapped values to determine the blended mapped value.

11. The non-transitory computer-readable storage medium of claim 7, wherein the operations further comprise:
  determining a center image pixel of the plurality of image pixels;
  for each adjacent unmapped image pixel of a plurality of adjacent unmapped image pixels:
    determining an offset between the center image pixel and the adjacent image pixel to generate an image center offset for the adjacent image pixel,
    wherein the weighting of the unmapped value that is associated with the adjacent image pixel is further determined according to the image center offset to generate a weighted unmapped value for the adjacent image pixel.

12. The non-transitory computer-readable storage medium of claim 11, wherein the unmapped value that is associated with the adjacent image pixel is weighted more heavily as the center offset becomes smaller.

13. The non-transitory computer-readable storage medium of claim 7, wherein the unmapped value that is associated with the adjacent image pixel is weighted less heavily as the center offset becomes larger.

14. The non-transitory computer-readable storage medium of claim 13, wherein the operations further comprise determining a center of gravity of the plurality of display pixels to identify the center display pixel.

15. The non-transitory computer-readable storage medium of claim 14, wherein the operations further comprise offsetting the center display pixel according to a configurable center offset.

16. A method, comprising:
  determining, by a system comprising a processor, that a plurality of display pixel columns is greater than a plurality of image pixel columns of media content and that a plurality of display pixel rows is not greater than a plurality of image pixel rows of the media content to identify a column expansion;
  mapping, by a system comprising a processor, a plurality of image pixels of the media content to a first portion of a plurality of display pixels of the display to create a plurality of mapped pairs each comprising a mapped image pixel of a plurality of mapped image pixels and a mapped display pixel of a plurality of mapped display pixels, wherein for each mapped pair of the plurality of mapped pairs, a value associated with the mapped image pixel is assigned to the mapped display pixel;

assigning, by the system, a plurality of blended mapped values to a plurality of unmapped display pixels in a second portion of the plurality of display pixels, wherein for each unmapped display pixel of the plurality of unmapped display pixels, the blended mapped value comprises a statistical compilation of a plurality of the values that are assigned to a plurality of the mapped display pixels that are adjacent to the unmapped display pixels, wherein the plurality of unmapped display pixels are weighted according to a plurality of offsets to a center display pixel, and wherein the mapping of the plurality of image pixels of media content to the first portion of the plurality of display pixels of the display and the assigning of the plurality of blended mapped values to the plurality of unmapped display pixels expands the plurality of image pixel columns to fit the plurality of display pixel columns; and presenting, by the system, the plurality of mapped display pixels and the plurality of unmapped display pixels at the display.

17. The method of claim 16, wherein each offset of the plurality of offsets comprises an offset between a center display pixel of the plurality of display pixels and one mapped display pixel of the plurality of mapped display pixels.

18. The method of claim 16, further comprising averaging, by the system, the plurality of the values to generate the plurality of blended mapped values.

\* \* \* \* \*